United States Patent
Tokuda et al.

(10) Patent No.: US 11,479,266 B2
(45) Date of Patent: Oct. 25, 2022

(54) REMOTE OPERATION SYSTEM, COMPUTER READABLE STORAGE MEDIUM, AND VEHICLE

(71) Applicant: TOYOTA JIDOSHA KABUSHIKI KAISHA, Toyota (JP)

(72) Inventors: Yosuke Tokuda, Toyota (JP); Masahiro Nishio, Toyota (JP); Shuichiro Takahashi, Toyota (JP); Haruka Yano, Toyota (JP); Taichi Amakasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/879,874

(22) Filed: May 21, 2020

(65) Prior Publication Data
US 2021/0031799 A1    Feb. 4, 2021

(30) Foreign Application Priority Data

Jul. 29, 2019    (JP) .............................. JP2019-139258

(51) Int. Cl.
| | | |
|---|---|---|
| *B60W 60/00* | (2020.01) | |
| *G05D 1/00* | (2006.01) | |
| *G01C 21/34* | (2006.01) | |

(52) U.S. Cl.
CPC ...... *B60W 60/0011* (2020.02); *B60W 60/005* (2020.02); *B60W 60/0025* (2020.02); *G01C 21/3453* (2013.01); *G05D 1/0022* (2013.01); *G05D 1/0027* (2013.01)

(58) Field of Classification Search
None
See application file for complete search history.

(56) References Cited

U.S. PATENT DOCUMENTS

| | | | |
|---|---|---|---|
| 2015/0197010 A1* | 7/2015 | Ruuspakka | B25J 9/1664 700/245 |
| 2016/0217690 A1* | 7/2016 | Yamasaki | H04L 67/12 |
| 2016/0358475 A1* | 12/2016 | Prokhorov | G05D 1/0088 |
| 2018/0095457 A1* | 4/2018 | Lee | G05D 1/0061 |
| 2018/0276485 A1* | 9/2018 | Heck | G01C 21/3461 |
| 2019/0041225 A1* | 2/2019 | Winkle | G01C 21/3453 |
| 2019/0176862 A1* | 6/2019 | Kumar | B64D 47/08 |
| 2019/0354111 A1* | 11/2019 | Cheng | G05D 1/0027 |
| 2020/0057436 A1 | 2/2020 | Boda et al. | |
| 2020/0191582 A1* | 6/2020 | Urano | B60W 60/00253 |
| 2020/0309553 A1* | 10/2020 | Onodera | B60W 10/20 |

FOREIGN PATENT DOCUMENTS

| | | |
|---|---|---|
| JP | 2016-018238 A | 2/2016 |
| JP | 2016-053518 A | 4/2016 |
| JP | 2018-054299 A | 4/2018 |
| JP | 2018-077652 A | 5/2018 |
| WO | 2018/087879 A1 | 5/2018 |

* cited by examiner

*Primary Examiner* — Khoi H Tran
*Assistant Examiner* — Tristan J Greiner
(74) *Attorney, Agent, or Firm* — Oliff PLC

(57) ABSTRACT

A remote operation system includes a processor that is configured to acquire position information and communication quality information from each of plural vehicles on a regular basis, create position-specific communication quality information in which the position information and the communication quality information are associated with each other, supply the position-specific communication quality information to an operator of a remote operation target vehicle.

7 Claims, 10 Drawing Sheets

FIG.3

| BLOCK | MEASUREMENT TIME | POSITION INFORMATION | | COMMUNICATION QUALITY INFORMATION (Mbps) |
|---|---|---|---|---|
| | | N | E | |
| A1 | 18:52:20 | 35° 38' 5.11" | 139° 52' 45.52" | 5.5 |
| | 18:52:30 | 35° 38' 5.12" | 139° 52' 45.55" | 6.2 |
| | ... | ... | ... | ... |
| A2 | 18:52:20 | 35° 39' 4.51" | 139° 52' 45.63" | 5.3 |
| | 18:52:30 | 35° 39' 4.53" | 139° 52' 45.66" | 7.4 |
| | ... | ... | ... | ... |
| ... | | | | |

13 B

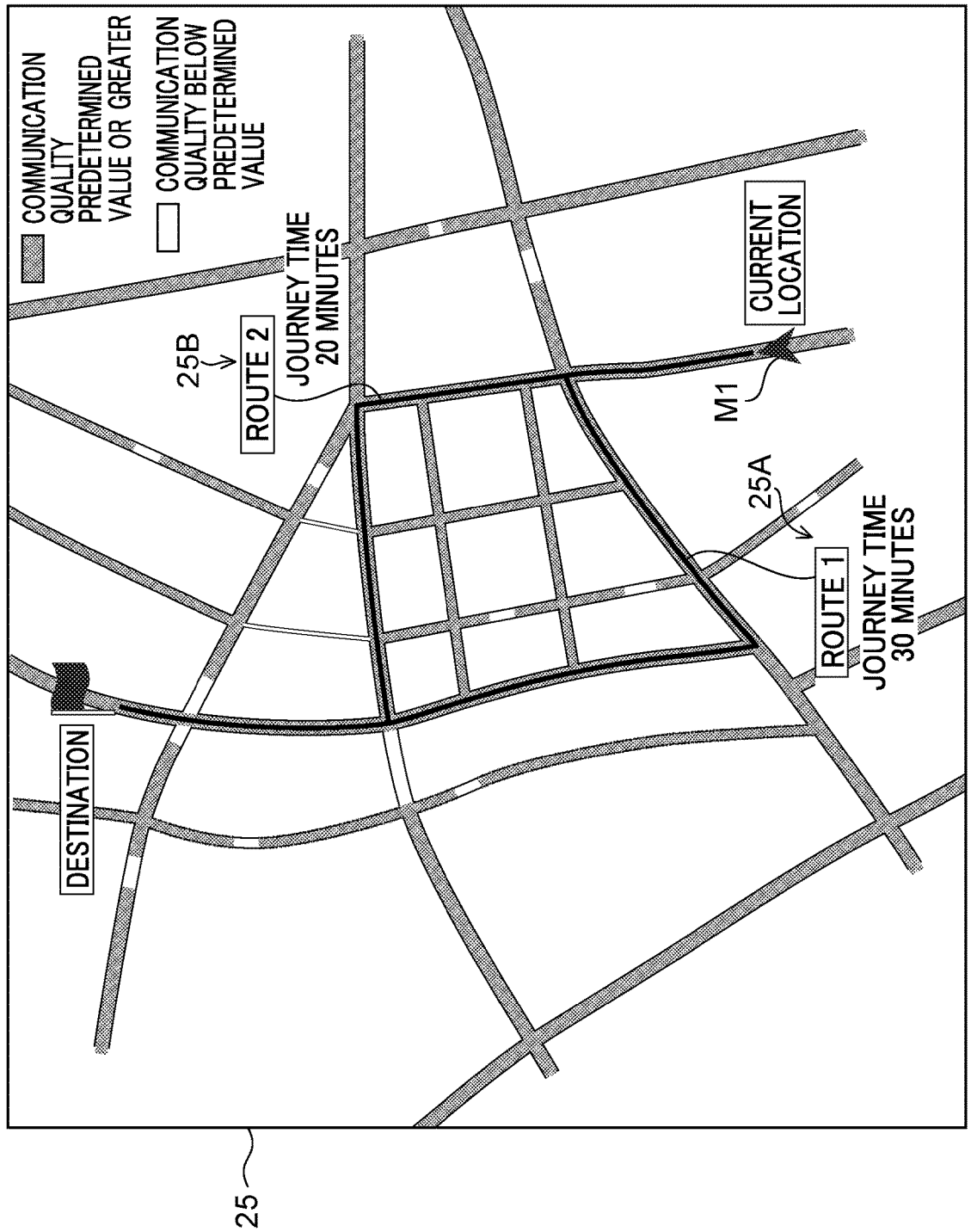

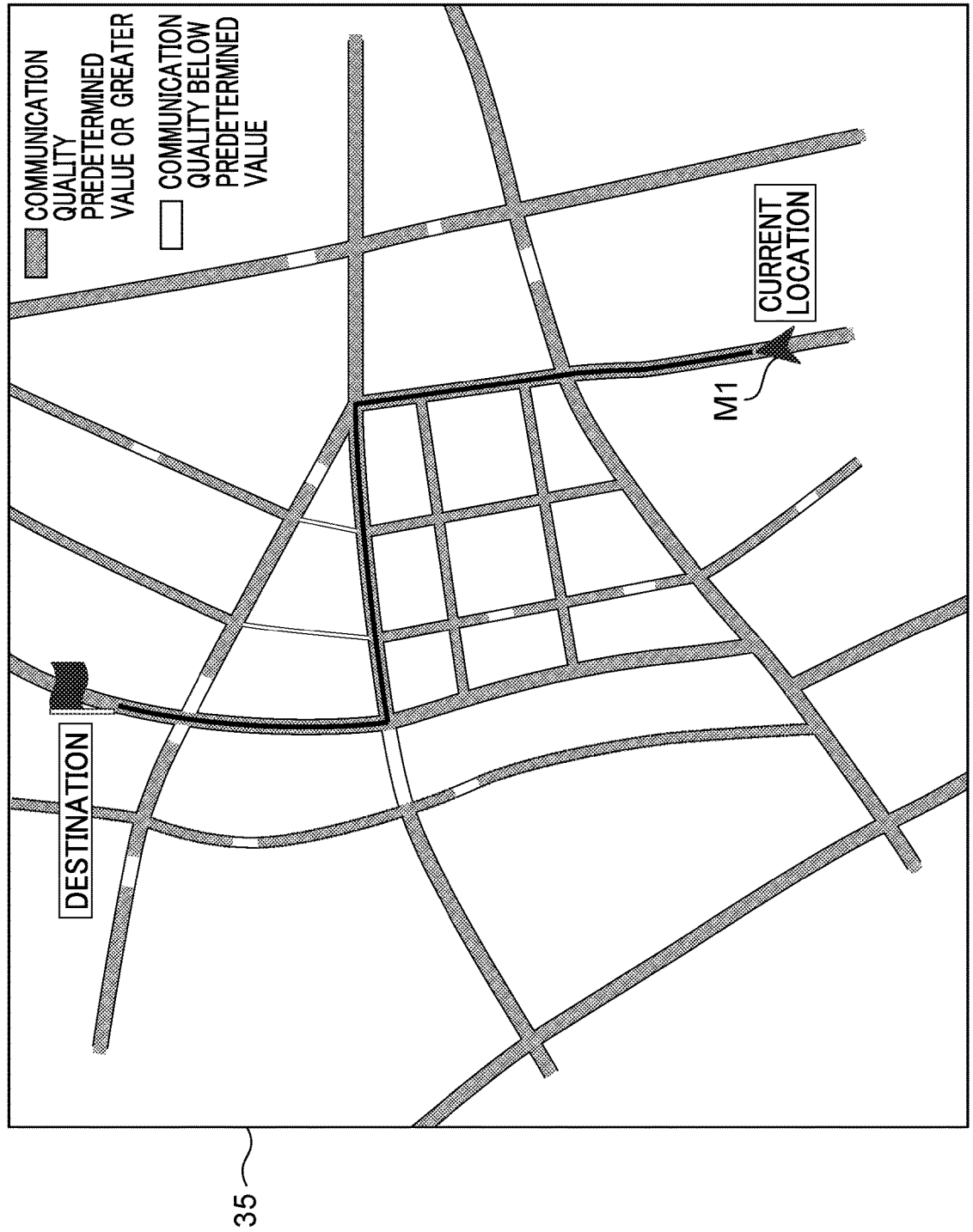

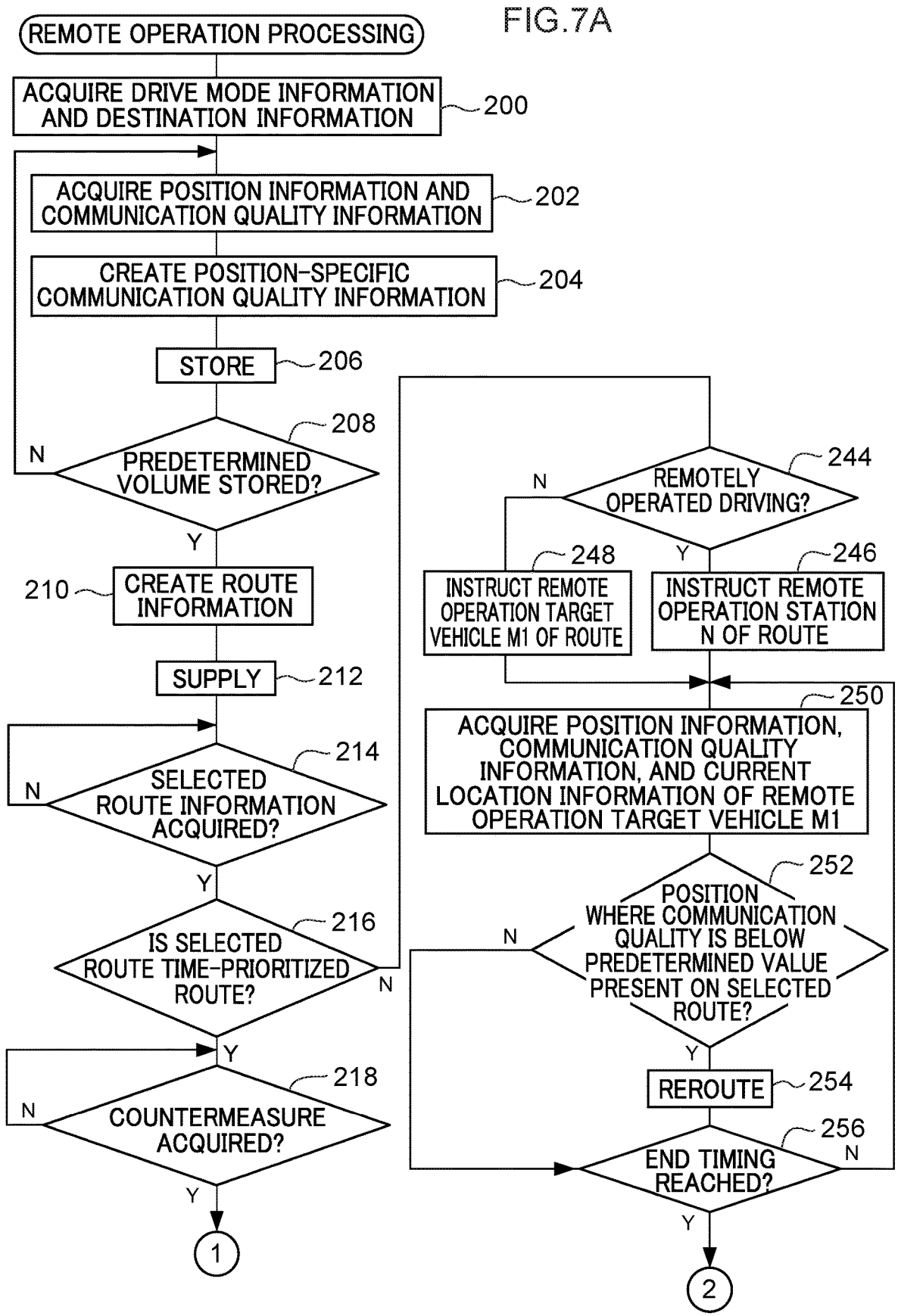

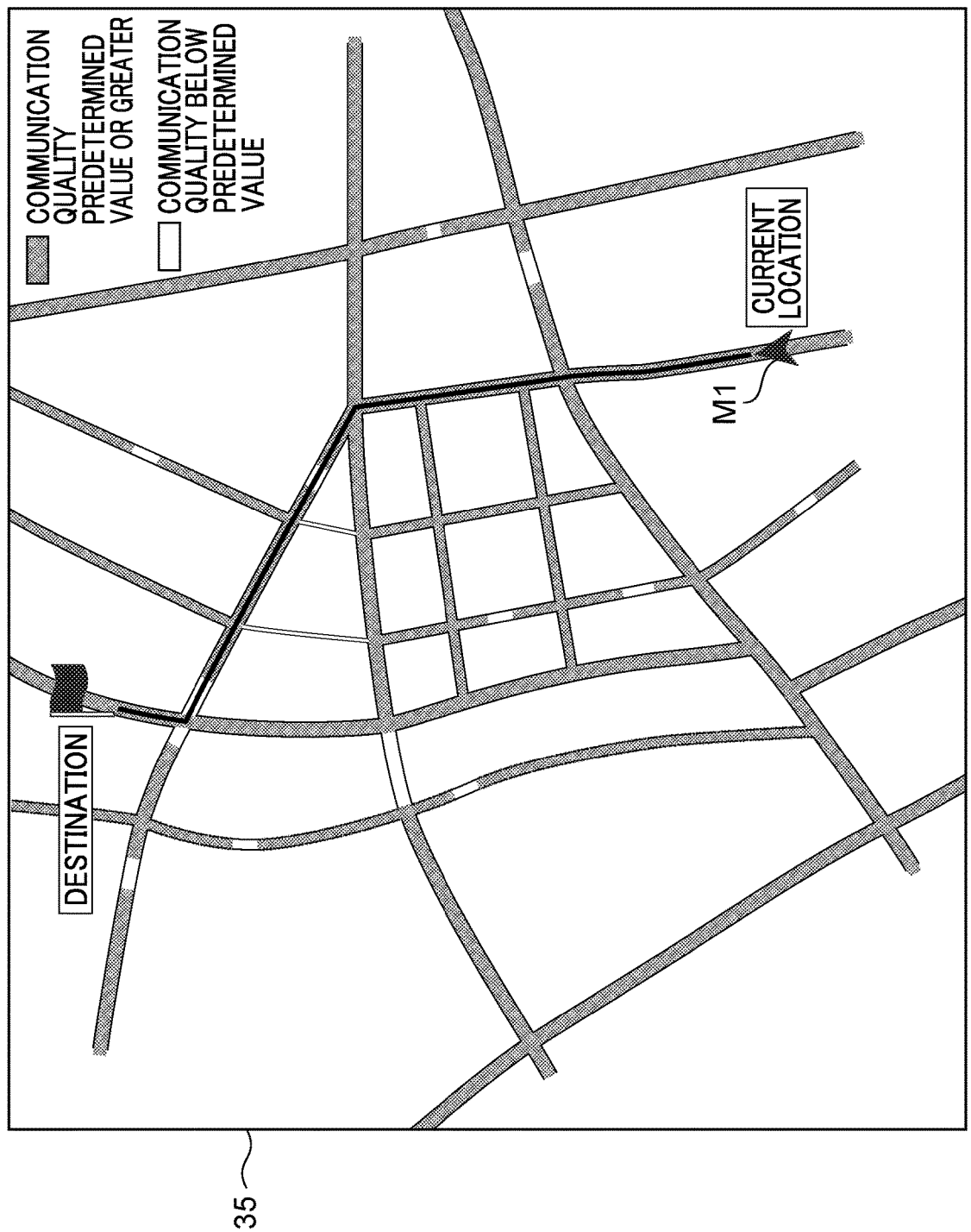

REMOTE OPERATION SYSTEM, COMPUTER READABLE STORAGE MEDIUM, AND VEHICLE

CROSS-REFERENCE TO RELATED APPLICATION

This application is based on and claims priority under 35 USC 119 from Japanese Patent Application No. 2019-139258 filed on Jul. 29, 2019, the disclosure of which is incorporated by reference herein.

BACKGROUND

Technical Field

The present disclosure relates to a remote operation system, a computer readable storage medium, and a vehicle.

Related Art

International Publication (WO) No. 2018/87879 discloses a remote operation system in which positions with a poor communication environment where the occurrence of communication problems are anticipated, such as tunnels, between tall buildings, and underground locations (anticipated communication problem occurrence positions) are held in a storage device. In this remote operation system, a travel route is set so as to avoid such anticipated communication problem occurrence positions.

In the remote operation system of WO No. 2018/87879, when a communication problem occurs at a position not held in the storage device as an anticipated communication problem occurrence position, it is difficult for a remote operation target vehicle to travel in a manner avoiding the position with poor communication quality.

SUMMARY

The present disclosure provides a remote operation system, computer readable storage medium, and vehicle capable of causing a remote operation target vehicle to travel in a manner avoiding positions where communication quality is low.

Solution to Problem

A remote operation system of a first aspect includes a processor that is configured to acquire position information and communication quality information from each of plural vehicles on a regular basis, create position-specific communication quality information in which the position information and the communication quality information are associated with each other, and supply the position-specific communication quality information to an operator of a remote operation target vehicle.

In the remote operation system of the first aspect, the operator of the remote operation target vehicle is supplied with the position-specific communication quality information in which the position information and the communication quality information of each of the plural vehicles are associated with each other. The position-specific communication quality information is created based on the position information and the communication quality information that are acquired "on a regular basis". The information is thus newer and more reliable than when position-specific communication quality information is held by a system in advance.

The operator of the remote operation target vehicle is thus capable of more accurately perceiving positions where communication quality is high and positions where communication quality is low. This enables the operator to remotely operate the remote operation target vehicle so as to avoid positions where communication quality is low. The remote operation target vehicle can thus be made to travel so as to avoid positions where communication quality is low.

Note that "on a regular basis" refers to each time a predetermined duration has elapsed. A "high" communication quality refers to a communication quality of a predetermined value or greater. Similarly, a "low" communication quality refers to a communication quality below a predetermined value. The predetermined value that is a threshold value for determining the high communication quality and the predetermined value that is a threshold value for determining the low communication quality may be the same values, or may be different values from each other.

A remote operation system of a second aspect is the remote operation system of the first aspect, wherein the processor is configured to create route information representing a route linking together positions where communication quality is a predetermined value or greater based on the position-specific communication quality information, and supply the route information to the operator.

In the remote operation system of the second aspect, the processor supplies the operator with the route information linking together positions where the communication quality is the predetermined value or greater, as well as the position-specific communication quality information. Thus, the operator can select a route with high communication quality more easily than in cases in which the operator is not supplied with route information. This increases the ease with which the remote operation target vehicle is made to travel so as to avoid positions where communication quality is low.

A remote operation system of a third aspect is the remote operation system of the first aspect or the second aspect, wherein the processor is configured to acquire drive mode information representing whether the remote operation target vehicle is set to remotely operated driving or manual driving, and supply the position-specific communication quality information to an occupant of the remote operation target vehicle, in cases in which a drive mode is manual driving.

In the remote operation system of the third aspect, the position-specific communication quality information can be supplied to the occupant of the remote operation target vehicle in cases in which the drive mode of the remote operation target vehicle is set to manual driving. This increases the ease with which the remote operation target vehicle can be made to travel so as to avoid positions where communication quality is low during manual driving also. This also facilitates switching to remotely operated driving at a desired timing.

A fourth aspect is a non-transitory computer readable storage medium storing a program that causes a computer to acquire position information and communication quality information from each of plural vehicles on a regular basis, create position-specific communication quality information in which the position information and the communication quality information are associated with each other, and supply the position-specific communication quality information to an operator of a remote operation target vehicle.

In the program of the fourth aspect, the operator of the remote operation target vehicle is supplied with the position-specific communication quality information in which the position information and the communication quality information of each of the plural vehicles are associated with each other. The position-specific communication quality information is created based on the position information and the communication quality information that are acquired "on a regular basis". The information is thus newer and more reliable than when position-specific communication quality information is held by a system in advance.

The operator of the remote operation target vehicle is thus capable of more accurately perceiving positions where communication quality is high and positions where communication quality is low. This enables the operator to remotely operate the remote operation target vehicle so as to avoid positions where communication quality is low. The remote operation target vehicle can thus be made to travel so as to avoid positions where communication quality is low.

A fifth aspect is a vehicle including a communication device configured to receive remote operation information created by a remote operation station, and a drive device operated based on the remote operation information. A route linking together positions where communication quality of the remote operation information is a predetermined value or greater is created as a travel route based on position information and communication quality information acquired on a regular basis from a plurality of information acquisition vehicles.

In the vehicle of the fifth aspect, the drive device is operated based on the remote operation information received by the communication device. As the travel route, the remote operation station creates a route linking together positions where communication quality is the predetermined value or greater based on the position information and communication quality information acquired from the plural information acquisition vehicles. The vehicle can thus be made to travel so as to avoid positions where communication quality is low.

The remote operation information is created based on the position information and the communication quality information that are acquired from the plural information acquisition vehicles "on a regular basis". The information is thus newer and more reliable than when position-specific communication quality information is held by a system in advance. This increases the ease with which the vehicle is made to travel so as to avoid positions where communication quality is low.

The present disclosure enables a remote operation target vehicle to be made to travel so as to avoid positions where communication quality is low.

BRIEF DESCRIPTION OF THE DRAWINGS

Exemplary embodiments of the present invention will be described in detail based on the following figures, wherein:

FIG. 3 is a schematic diagram illustrating an example of configuration of a communication quality information database according to an exemplary embodiment;

FIG. 5 is a plan view illustrating an example of position-specific communication quality information and communication-prioritized route information displayed on a display section of a remote operation target vehicle according to an exemplary embodiment;

FIG. 6 is a vehicle illustrating an example of a selected route displayed on a display section of a remote operation station according to an exemplary embodiment;

FIG. 7A is a flowchart illustrating part of another example of remote operation processing according to an exemplary embodiment;

FIG. 9 is a plan view illustrating another example of a selected route displayed on a display section of a remote operation station according to an exemplary embodiment.

DETAILED DESCRIPTION

Figure 1:
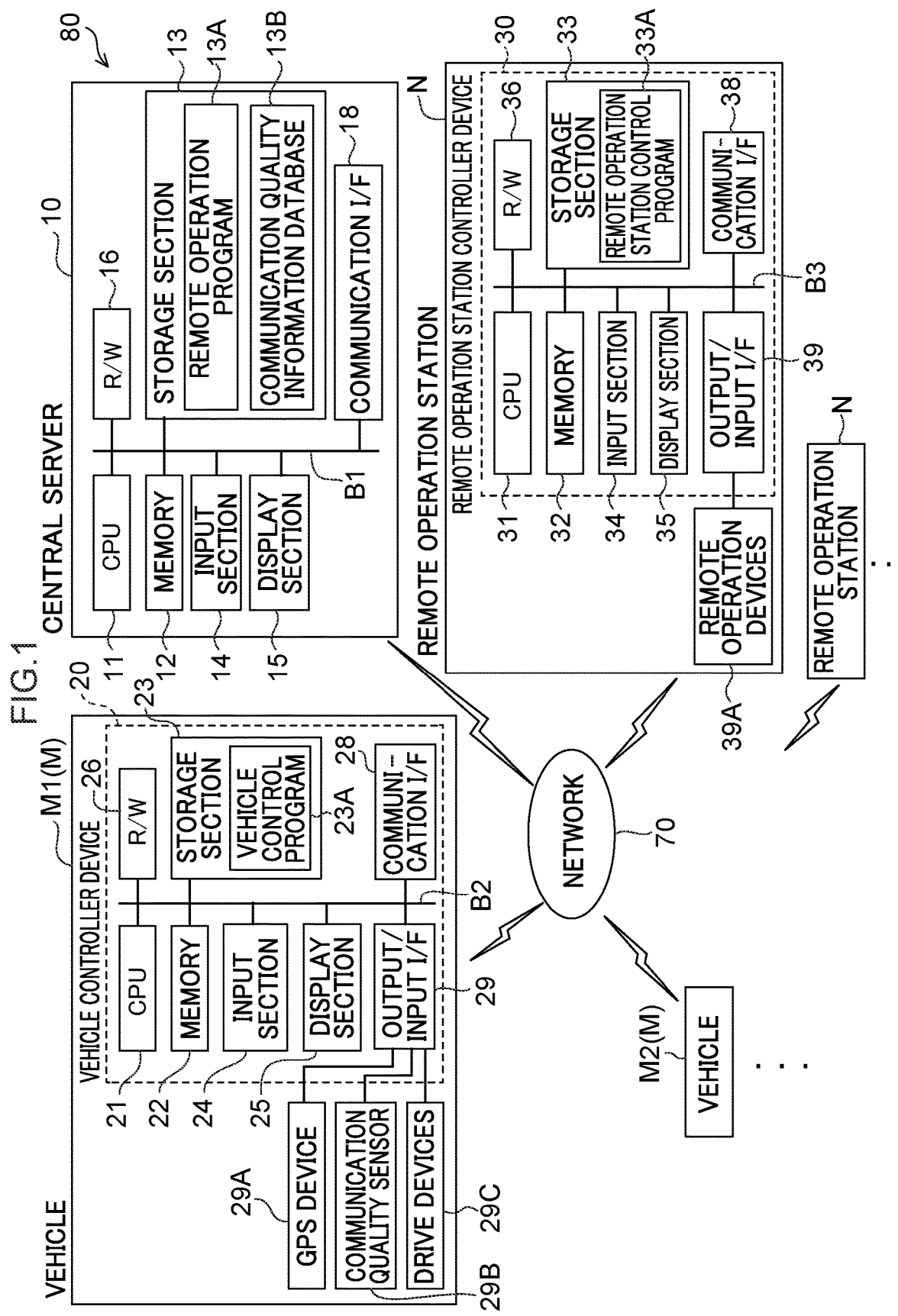
FIG. 1 is a configuration diagram illustrating an overall configuration of a remote operation system according to an exemplary embodiment.

Explanation follows regarding a remote operation system according to an exemplary embodiment of the present disclosure, with reference to the drawings. In the drawings, configuration elements appended with the same reference numerals indicate equivalent configuration elements. Where configurations and reference numerals are duplicated in the drawings, explanation thereof may be omitted. Note that the present disclosure is not limited to the following exemplary embodiment, and appropriate modifications such as omitting configurations, substituting for other configurations, and the like may be implemented within the scope of the objectives of the present disclosure.

Remote Operation System

FIG. 1 illustrates an overall configuration of a remote operation system 80 according to an exemplary embodiment of the present disclosure. The remote operation system 80 is a system employed in remote operation of plural vehicles M. Specifically, the remote operation system 80 is configured including the plural vehicles M, plural remote operation stations N for remote operation of the plural vehicles M, and a central server 10 that controls remote operation of the vehicles M by the remote operation stations N. The vehicles M, the remote operation stations N, and the central server 10 are each capable of accessing a network 70.

Note that in the following explanation, out of the vehicles M, a vehicle configuring a remote operation target of a remote operation station N is also referred to as the remote operation target vehicle M1 where necessary. Out of the vehicles M, vehicles other than the remote operation target vehicle M1 are also referred to as information acquisition vehicles M2. Unless specifically stated, explanation regarding the vehicles M is applicable to both the remote operation target vehicle M1 and the information acquisition vehicles M2.

Hardware Configuration Central Server

The central server 10 includes a central processing unit (CPU: processor) 11, memory 12 serving as a temporary storage region, a non-volatile storage section 13, an input section 14, a display section 15, a medium read/write device (R/W) 16, and a communication interface (I/F) 18. The CPU 11, the memory 12, the storage section 13, the input section 14 configured by a keyboard, mouse, and the like, the display section 15 configured by a liquid crystal display or the like, the R/W 16 and the communication I/F 18 are connected together through a bus B1.

The storage section 13 is implemented by a hard disk drive (HDD), a solid state drive (SSD), flash memory, or the like. The storage section 13 serves as a storage medium, and stores a remote operation program 13A and a communication quality information database 13B. The remote operation program 13A is a program to execute supply processing to supply various information to the remote operation target vehicle M1, and various instruction processing that enables the corresponding remote operation station N to perform remote operation of the remote operation target vehicle M1. The communication quality information database 13B will be described in detail later.

The remote operation program 13A is stored in the storage section 13 by loading a recording medium on which the remote operation program 13A is written into the R/W 16, and the R/W 16 reading the remote operation program 13A from the recording medium. The CPU 11 reads the remote operation program 13A from the storage section 13, expands the remote operation program 13A in the memory 12, and executes processes of the remote operation program 13A in sequence. The R/W 16 reads information that has been written to non-illustrated recording media and writes information to such recording media.

The communication I/F 18 is an interface for communication with the vehicles M and the remote operation stations N, and employs a protocol such as Ethernet (registered trademark), a fiber distributed data interface (FDDI), or Wi-Fi (registered trademark). The communication I/F 18 is connected to the network 70. The communication I/F 18 has a function of communicating with the plural vehicles M and the plural remote operation stations N. Namely, various information transmitted from communication I/Fs 28 of the vehicles M and various information transmitted from communication I/Fs 38 of the remote operation stations N are received by the communication I/F 18.

Vehicle

Each of the vehicles M includes a communication device (communication I/F 28) that receives remote operation information created by the corresponding remote operation station N, and drive devices 29C that are operated based on the remote operation information. The remote operation information is created as information based on position information and communication quality information acquired from the plural information acquisition vehicles M2 on a regular basis, in order to set a route linking together positions having a communication quality of a predetermined value or greater as a travel route. The communication I/F 28, the drive devices 29C, the position information, and the communication quality information will be described in detail later.

Each of the vehicles M is installed with a vehicle controller device 20. The vehicle controller device 20 includes a central processing unit (CPU: processor) 21, memory 22 serving as a temporary storage region, a non-volatile storage section 23, an input section 24, a display section 25, a medium read/write device (R/W) 26, the communication interface (I/) 28, and an output/input interface (I/F) 29. The CPU 21, the memory 22, the storage section 23, the input section 24, the display section 25, the R/W 26, the communication I/F 28, and the output/input I/F 29 are connected together through a bus B2.

The storage section 23 is implemented by a hard disk drive (HDD), a solid state drive (SSD), flash memory, or the like. The storage section 23 serves as a storage medium and stores a vehicle control program 23A. The vehicle control program 23A is a program to execute various processing in the vehicle controller device 20 accompanying the execution of processes of the remote operation program 13A of the central server 10 described above.

The vehicle control program 23A is stored in the storage section 23 by loading a recording medium to which the vehicle control program 23A is written into the R/W 26, and the R/W 26 reading the vehicle control program 23A from the recording medium. The CPU 21 reads the vehicle control program 23A from the storage section 23, expands the vehicle control program 23A in the memory 22, and executes processes of the vehicle control program 23A in sequence.

The input section 24 and the display section 25 are configured including a non-illustrated liquid crystal display configured by a touch panel provided on a center console or dashboard of the vehicle M.

As illustrated as an example in FIG. 8, the display section 25 is capable of displaying position-specific communication quality information and route information, described later. For example, the route information includes a "communication-prioritized route" representing a route linking together positions having a communication quality of a predetermined value or greater. Another example of the route information is a "time-prioritized route" representing a route having a shorter journey time to a destination than the communication-prioritized route. The display section 25 is also capable of displaying for example predetermined countermeasure information to enable stable travel to be maintained at positions where the communication quality is below a predetermined value.

The input section 24 serves as an input device, and enables input of a selected route (namely, either a communication-prioritized route or a time-prioritized route). The input section 24 also enables input of a predetermined countermeasure to enable stable travel to be maintained at positions where the communication quality is below the predetermined value.

The R/W 26 reads information that has been written to non-illustrated recording media, and writes information to such recording media.

The communication I/F 28 is an interface (communication device) for communicating with other vehicles M, an external server, and the like, and employs a protocol such as Ethernet (registered trademark), an FDDI, or Wi-Fi (registered trademark). The communication I/F 28 is connected to the network 70. The communication I/F 28 has a function of communicating with the central server 10. Namely, various information transmitted from the communication I/F 18 of the central server 10 is received by the communication I/F 28.

The output/input I/F 29 is an interface for communication with various devices installed in the vehicle M. A GPS device 29A, a communication quality sensor 29B, and the drive devices 29C are connected to the vehicle controller device 20 of the present exemplary embodiment through the output/input I/F 29.

Note that the GPS device 29A, the communication quality sensor 29B, and the drive devices 29C may be directly connected to the bus B2. Alternatively, these devices may be connected through a controller area network (CAN), or may be connected through various electronic control units (ECUs) or gateway ECUs.

Although not illustrated in the drawings, a camera that captures images over a predetermined range, a millimeter-wave radar that transmits search waves over a predetermined range, light detection and ranging/laser imaging detection and ranging (LIDAR) that scans over a predetermined range, and the like are also connected to the vehicle controller device 20 through the output/input I/F 29.

The GPS device 29A has a function of measuring current position coordinates of the vehicle M based on radio waves from global positioning system (GPS) satellites. Namely, position coordinates measured by the GPS device 29A serve as "position information" of the vehicle M in the vehicle controller device 20.

The communication quality sensor 29B is a sensor used to measure the communication quality between the communication I/F 28 and the central server 10 (network 70). Equipment capable of measuring communication quality is selected as appropriate according to the communication protocol employed by the communication I/F 28 (for example Ethernet (registered trademark), an FDDI, Wi-Fi (registered trademark) or the like, as described above).

The drive devices 29C are configured including a steering actuator, an acceleration actuator, and a brake actuator, none of which are illustrated in the drawings. The steering actuator steers front wheels of the vehicle M. The acceleration actuator controls a travel motor of the vehicle M to cause the vehicle M to accelerate or decelerate. The brake actuator controls brakes of the vehicle M to cause the vehicle M to decelerate.

Remote Operation Station

Each of the remote operation stations N that remotely operate the remote operation target vehicles M1 are installed with a remote operation station controller device 30. The remote operation station controller device 30 includes a central processing unit (CPU: processor) 31, memory 32 serving as a temporary storage region, a non-volatile storage section 33, an input section 34, a display section 35, a medium read/write device (R/W) 36, the communication interface (I/F) 38, and an output/input interface (I/F) 39. The CPU 31, the memory 32, the storage section 33, the input section 34, the display section 35, the R/W 36, the communication I/F 38, and the output/input I/F 39 are connected together through a bus B3.

The storage section 33 is implemented by a hard disk drive (HDD), a solid state drive (SSD), flash memory, or the like. The storage section 33 serves as a storage medium and stores a remote operation station control program 33A. The remote operation station control program 33A is a program to execute various processing in the remote operation station controller device 30 accompanying the execution of processes of the remote operation program 13A of the central server 10 described above.

The remote operation station control program 33A is stored in the storage section 33 by loading a recording medium on which the remote operation station control program 33A is written into the R/W 36, and the R/W 36 reading the remote operation station control program 33A from the recording medium. The CPU 31 reads the remote operation station control program 33A from the storage section 33, expands the remote operation station control program 33A in the memory 32, and executes processes of the remote operation station control program 33A in sequence.

The input section 34 and the display section 35 are configured including a non-illustrated liquid crystal display configured by a non-illustrated touch panel provided on a center console or dashboard simulating a generic vehicle.

The display section 35 includes a non-illustrated head-up display. The head-up display performs real-time display of captured images captured by the camera provided to the vehicle controller device 20 of the remote operation target vehicle M1. Note that the remote operation target vehicle M1 is a remote operation target vehicle that has been associated with the remote operation station N in response to an instruction from the central server 10. A user (remote operator) operating the remote operation station N is thus capable of experiencing spatial perception substantially equivalent to that of an occupant sitting in a driver's seat of the remote operation target vehicle M1 (namely, spatial perception relating to an outdoor space around the remote operation target vehicle M1).

The R/W 36 reads information that has been written to non-illustrated recording media, and writes information to such recording media.

The communication I/F 38 is an interface for communication with the vehicles M, an external server, and the like, and employs a protocol such as Ethernet (registered trademark), an FDDI, or Wi-Fi (registered trademark). The communication I/F 38 is connected to the network 70. The communication I/F 38 has a function of communicating with the central server 10. Namely, various information transmitted from the communication I/F 18 of the central server 10 is received by the communication I/F 38.

The output/input I/F 39 is an interface for communicating with various devices installed in the remote operation station N. Remote operation devices 39A are connected to the remote operation station controller device 30 of the present exemplary embodiment through the output/input I/F 39.

Note that the remote operation devices 39A may be directly connected to the bus B3. Alternatively, the remote operation devices 39A may be connected through a controller area network (CAN), or may be connected through ECUs or gateway ECUs.

The remote operation devices 39A are configured including a steering operation device, an accelerator operation device, a brake operation device, and the like, none of which are illustrated in the drawings. The steering operation device performs proxy steering of the front wheels of the remote operation target vehicle M1 that has been associated with the remote operation station N in response to an instruction from the central server 10. The accelerator operation device causes the remote operation target vehicle M1 to accelerate or decelerate by performing proxy control of the non-illustrated travel motor of the remote operation target vehicle M1. The brake operation device causes the remote operation target vehicle M1 to decelerate by performing proxy control of the brakes of the remote operation target vehicle M1.

Note that operation of the remote operation devices 39A does not directly operate the drive devices 29C of the remote operation target vehicle M1. In cases in which a drive mode of the remote operation target vehicle M1 corresponds to a remotely operated driving state, the user operating the remote operation station N performs proxy operation of the remote operation devices 39A as described above such that operation amounts (physical quantities) are transmitted to the remote operation target vehicle M1 through the central server 10 as "remote operation information". Operation amounts of the drive devices 29C are determined in response to this remote operation information.

Functional Configuration of Central Server

Figure 2:
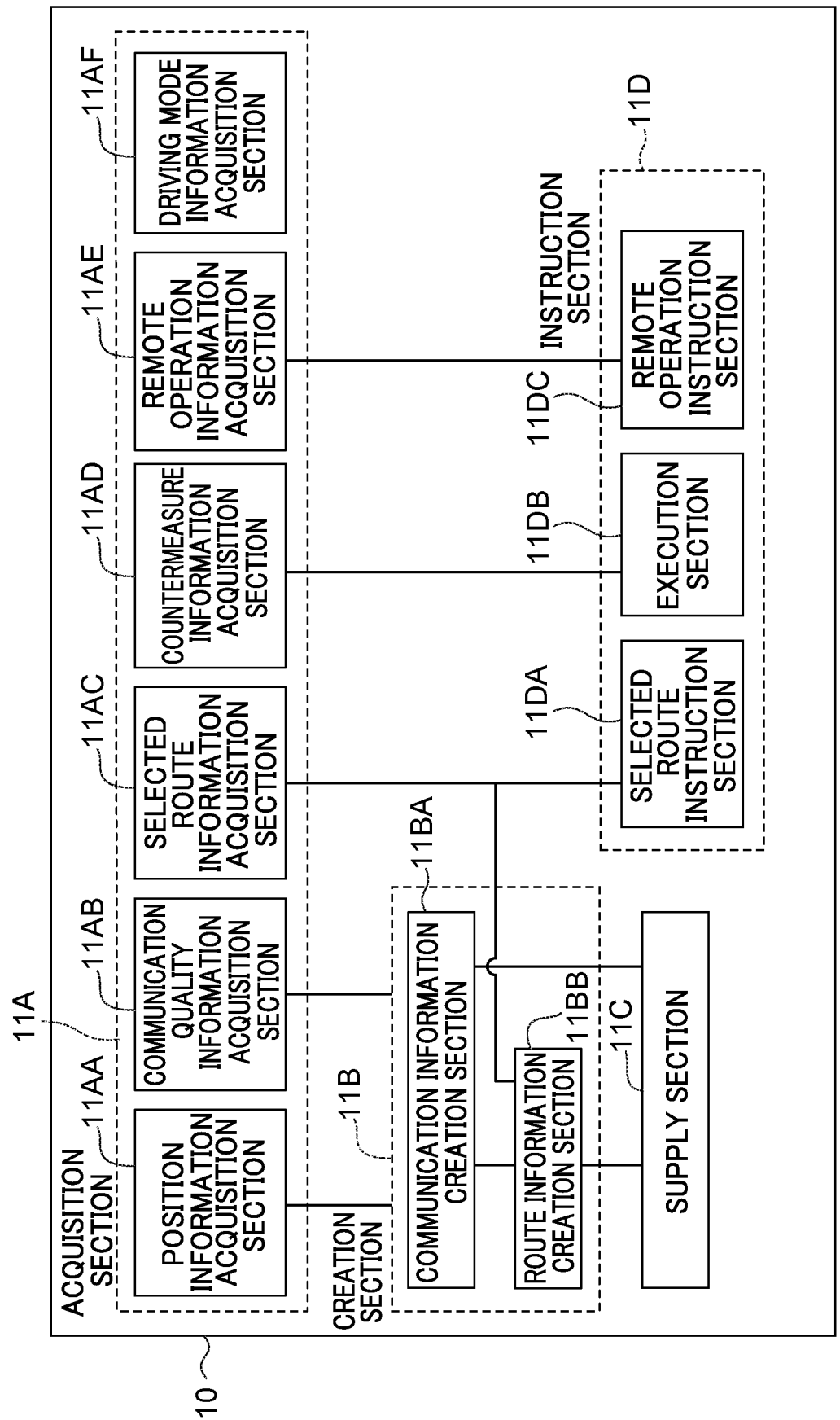
FIG. 2 is a functional block diagram illustrating a central server of a remote operation system according to an exemplary embodiment.

Next, explanation follows regarding functional configuration of the central server 10 according to the present exemplary embodiment, with reference to FIG. 2. As illustrated in FIG. 2, the central server 10 includes an acquisition section 11A, a creation section 11B, a supply section 11C, and an instruction section 11D. The CPU 11 (see FIG. 1) of the central server 10 functions as the acquisition section 11A, the creation section 11B, the supply section 11C, and the instruction section 11D by executing the remote operation program 13A (see FIG. 1).

Acquisition Section

The acquisition section 11A acquires the position information and communication quality information from the plural vehicles M (see FIG. 1) on a regular basis. The acquisition section 11A also acquires drive mode information indicating whether the remote operation target vehicle M1 is set to remotely operated driving or manual driving.

Specifically, the acquisition section 11A of the present exemplary embodiment is configured including a position information acquisition section 11AA, a communication quality information acquisition section 11AB, a selected route information acquisition section 11AC, a countermeasure information acquisition section 11AD, a remote operation information acquisition section 11AE, and a drive mode information acquisition section 11AF.

The position information acquisition section 11AA acquires "position information", indicating the positions measured by the GPS device 29A (see FIG. 1) provided to each of the plural vehicles M, from the plural vehicles M on a regular basis (at predetermined intervals, for example every 10 seconds).

The communication quality information acquisition section 11AB acquires "communication quality information", indicating the communication quality measured by the communication quality sensor 29B (see FIG. 1) provided to each of the plural vehicles M, from the plural vehicles M on a regular basis (in other words, at predetermined intervals, for example every 10 seconds). Note that the position information and the communication quality information are acquired at substantially the same timing as each other.

The selected route information acquisition section 11AC acquires current location information acquired by the GPS device 29A of the remote operation target vehicle M1, and destination information as specified by an occupant of the remote operation target vehicle M1 using the input section 24 (see FIG. 1), from the remote operation target vehicle M1.

The selected route information acquisition section 11AC acquires "selected route information", indicating a selected route selected by the occupant of the remote operation target vehicle M1 from out of plural "route information" items created by a route information creation section 11BB, described later, from the remote operation target vehicle M1.

The countermeasure information acquisition section 11AD acquires "countermeasure information", indicating a countermeasure selected by the occupant of the remote operation target vehicle M1, from the remote operation target vehicle M1.

Here, the "countermeasure" refers to a predetermined method for maintaining stable travel at positions where the communication quality is below the predetermined value. Specifically, the countermeasure is a method for maintaining stable travel in cases in which the remote operation target vehicle M1 passes through a position where the communication quality between the remote operation target vehicle M1 and the central server 10 (network 70) is below the predetermined value when traveling by remote operation.

At least one mode out of "switch communication type" and "switch to manual driving" is selected as the countermeasure. Switching the communication type enables communication quality to be maintained. Alternatively, switching from remotely operated driving to manual driving enables travel to continue even if communication cuts out. Switching to manual driving and also switching communication type facilitates an earlier switch back to remotely operated driving, while continuing to travel by manual driving. These countermeasures enable stable travel of the remote operation target vehicle M1 to be maintained.

Note that the communication types that can be switched between include the various communication protocols described above as being applicable as communication protocols employed by the communication I/F 28, as well as communication protocols employed in cellphone networks and communication protocols employed in short-range wireless communication.

The remote operation information acquisition section 11AE acquires "remote operation information" created by the corresponding remote operation station N from the remote operation station N on a constant basis (in other words at predetermined intervals, for example every 0.01 seconds) when the remote operation target vehicle M1 is traveling by remote operation.

The drive mode information acquisition section 11AF acquires "drive mode information", indicating the drive mode (namely either remotely operated driving or manual driving), selected by the occupant of the remote operation target vehicle M1 from the remote operation target vehicle M1.

Creation Section

The creation section 11B includes a communication information creation section 11BA and the route information creation section 11BB.

The communication information creation section 11BA of the creation section 11B creates "position-specific communication quality information" in which the position information and communication quality information are associated with each other.

Specifically, the communication information creation section 11BA creates a communication quality (position-specific communication quality information) for each position coordinate. The position-specific communication quality information is created by associating the position information acquired by the position information acquisition section 11AA with the communication quality information acquired by the communication quality information acquisition section 11AB. The position-specific communication quality information is recorded in the communication quality information database 13B (see FIG. 1).

Based on the position-specific communication quality information, the route information creation section 11BB creates "communication-prioritized route information" representing a route linking together positions where the communication quality is the predetermined value or greater. The route information creation section 11BB also creates "time-prioritized route information" representing a route having a shorter journey time to a destination than the communication-prioritized route.

Specifically, the route information creation section 11BB reads plural of the position-specific communication quality information items created by the communication information creation section 11BA from the communication quality information database 13B. Next, positions where the communication quality is the predetermined value or greater are extracted from the position-specific communication quality information.

The route information creation section 11BB of the creation section 11B also acquires the current location information and destination information of the remote operation target vehicle M1 as acquired by the selected route information acquisition section 11AC. The route information creation section 11BB then links together positions extracted as positions where the communication quality is the predetermined value or greater in a journey segment between the current location and the destination. A route joining the current location to the destination is thus created.

In other words, the route information creation section 11BB creates a route where the communication quality is not expected to fall below the predetermined value between the current location and the destination of the remote operation target vehicle M1 as the "communication-prioritized route".

Note that the communication-prioritized route is created by linking together positions extracted as positions where the communication quality is the predetermined value or greater. There are therefore cases in which the route created makes a diversion around a position where the communication quality is below the predetermined value. This could result in a longer journey than one that does not make a diversion around such a position, resulting in a longer journey time before reaching the destination.

In order to accommodate such situations, the route information creation section 11BB also creates the "time-prioritized route information" representing a route having a shorter journey time to the destination than the communication-prioritized route.

The time-prioritized route is, for example, a route that does not make a diversion around positions where the communication quality is below the predetermined value. Namely, the time-prioritized route is the route enabling the remote operation target vehicle M1 to move between the current location and the destination in the shortest amount of time (estimated time). Alternatively, as another example, the time-prioritized route may be a route that makes a diversion around positions where the communication quality is below a predetermined value, but with the predetermined value of the communication quality that necessitates a diversion set lower than for the communication-prioritized route. Namely, the time-prioritized route is a route having at least a shorter journey time to the destination than the communication-prioritized route.

Note that in the present specification, the communication-prioritized route information and the time-prioritized route information are also collectively referred to as "route information".

Supply Section

The supply section 11C supplies position-specific communication quality information to the operator of the remote operation target vehicle M1. Specifically, the supply section 11C supplies the position-specific communication quality information created by the creation section 11B described above to the operator of the remote operation target vehicle M1.

The operator of the remote operation target vehicle M1 refers to the operator operating the remote operation devices 39A at the remote operation station N during remotely operated driving, and refers to the operator operating the drive devices 29C, this being the occupant of the remote operation target vehicle M1, during manual driving.

Note that the position-specific communication quality information supplied by the supply section 11C is displayed on the display section 35 (see FIG. 1) of the remote operation station N or on the display section 25 (see FIG. 1) of the remote operation target vehicle M1. The position-specific communication quality information may be displayed on the display section 25 as well as on the display section 35 during remotely operated driving.

The supply section 11C also supplies communication-prioritized route information and time-prioritized route information to the occupant of the remote operation target vehicle M1. Specifically, the supply section 11C supplies the communication-prioritized route information and the time-prioritized route information created by the creation section 11B described above to the occupant of the remote operation target vehicle M1. Note that the occupant may be the operator.

The communication-prioritized route information and the time-prioritized route information supplied by the supply section 11C is displayed on the display section 25 of the remote operation target vehicle M1. This enables the occupant of the remote operation target vehicle M1 to select a travel route.

Instruction Section

The instruction section 11D is configured including a selected route instruction section 11DA, an execution section 11DB, and a remote operation instruction section 11DC.

The selected route instruction section 11DA of the instruction section 11D instructs the corresponding remote operation station N of a selected route selected by the occupant of the remote operation target vehicle M1 based on the communication-prioritized route information and the time-prioritized route information. Specifically, the selected route instruction section 11DA transmits the selected route information acquired by the selected route information acquisition section 11AC described above to the remote operation station N as instruction information during remotely operated driving. The selected route information transmitted by the selected route instruction section 11DA is displayed on the display section 35 of the remote operation station N.

Note that during manual driving, the selected route selected by the occupant of the remote operation target vehicle M1 is displayed on the display section 25 of the remote operation target vehicle M1 without the involvement of an instruction from the selected route instruction section 11DA.

Moreover, during remotely operated driving, the plural "route information" items created by the route information creation section 11BB may be supplied to the remote operation station N for the travel route to be selected using the remote operation station N (namely, the "selected route information" may be created by the remote operation station N). In such cases, the selected route is displayed on the display section 35 of the remote operation station N without the involvement of an instruction from the selected route instruction section 11DA.

The execution section 11DB of the instruction section 11D executes a predetermined method to maintain stable travel at positions where the communication quality is below the predetermined value. Specifically, the execution section 11DB executes the countermeasure acquired as the countermeasure information by the countermeasure information acquisition section 11AD.

The countermeasure is executed during travel of the remote operation target vehicle M1 by remote operation when passing through a position where the communication quality between the remote operation target vehicle M1 and the central server 10 (network 70) is below the predetermined value.

Namely, the execution section 11DB executes at least one countermeasure out of "switching communication type" or "switching to manual driving" as described above when passing through a position where the communication quality is below the predetermined value. From the perspective of maintaining continuous stable travel of the remote operation target vehicle M1, these countermeasures are also executed in journey segments of the travel route before and after the position where the communication quality is below the predetermined value (for example journey segments of 500 m before and after). In the following explanation, such journey segments before and after a position where the communication quality is below the predetermined value are referred to as "adjacent journey segments". In order to avoid confusion, even in cases in which positions where the communication quality is below the predetermined value join up to form a continuous journey segment, this journey segment is still referred to as a "position" where the communication quality is below the predetermined value.

The remote operation instruction section 11DC of the instruction section 11D transmits the remote operation information acquired by the remote operation information acquisition section 11AE described above to the remote operation target vehicle M1 on a constant basis (in other words at predetermined intervals, for example every 0.01 seconds) while the remote operation target vehicle M1 is traveling by remote operation.

Note that although the central server 10 includes the remote operation information acquisition section 11AE and the remote operation instruction section 11DC in the present exemplary embodiment, the present disclosure is not limited to such an exemplary embodiment. For example, these sections may be omitted. If these sections are omitted, remote operation information is transmitted from the corresponding remote operation station N to the remote operation target vehicle M1 without passing through the central server 10.

Communication Quality Information Database

The position information and communication quality information transmitted from the plural vehicles M to the central server 10 are recorded in association with each other in the communication quality information database 13B illustrated in FIG. 3. The position information and the communication quality information are recorded together with their measurement time. Note that the position information is expressed in north latitude and east longitude in countries such as Japan, but may be expressed in south latitude and west longitude depending on the country or region.

The position information and the communication quality information are stored in blocks. These blocks correspond to areas of a map divided into a grid of squares of a predetermined size (for example 50 m×50 m).

Operation

Figure 4:
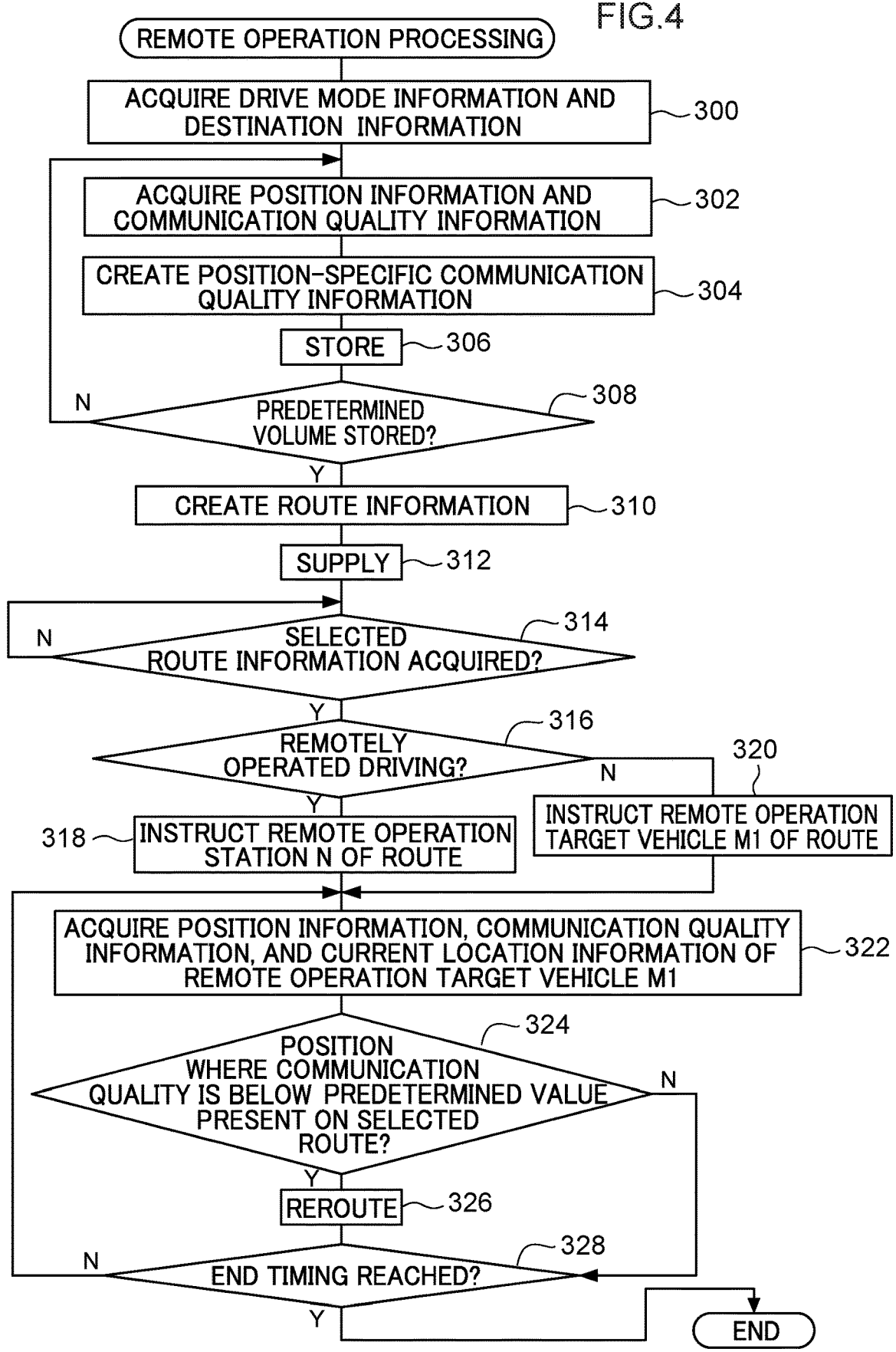
FIG. 4 is a flowchart illustrating an example of remote operation processing according to an exemplary embodiment.

Next, explanation follows regarding an example of operation of the remote operation system according to the present exemplary embodiment, with reference to FIG. 4. The remote operation processing illustrated in FIG. 4 is executed by the CPU 11 of the central server 10 executing the remote operation program 13A in response to an execution instruction or the like given by the occupant of the remote operation target vehicle M1 using the input section 24.

In the present exemplary embodiment, the occupant of the remote operation target vehicle M1 inputs a destination for the remote operation target vehicle M1 when giving the execution instruction. In order to avoid confusion, explanation follows regarding a case in which a sufficient number of the information acquisition vehicles M2 are present between the current location of the remote operation target vehicle M1 and its destination. Moreover, the individual drawing references are omitted when referring to the respective configurations illustrated in FIG. 1 to FIG. 3, since it is understood that these configurations refer to FIG. 1 to FIG. 3.

When execution of the remote operation program 13A is started, at step 300 the drive mode information acquisition section 11AF acquires the drive mode information transmitted from the remote operation target vehicle M1. Furthermore, the selected route information acquisition section 11AC acquires the destination information transmitted from the remote operation target vehicle M1.

At step 302, the position information acquisition section 11AA acquires the position information transmitted from the information acquisition vehicles M2. Furthermore, the communication quality information acquisition section 11AB acquires the communication quality information transmitted from the information acquisition vehicles M2.

At step 304, the communication information creation section 11BA creates position-specific communication quality information in which the position information and the communication quality information are associated with each other.

At step 306, the communication information creation section 11BA stores the position-specific communication quality information in the communication quality information database 13B.

At step 308, the route information creation section 11BB determines whether or not a predetermined volume or greater of the position-specific communication quality information has been stored. Processing transitions to step 310 when determination is affirmative at step 308. Note that "a predetermined volume or greater having been stored" refers to a state in which at least one item of position-specific communication quality information has been stored for each of the plural blocks (see FIG. 3) present on a continuous travel route from the current location of the remote operation target vehicle M1 to its destination. Processing returns to step 302 when determination is negative at step 308, and the processing up to step 308 is repeated until determination becomes affirmative.

At step 310, the route information creation section 11BB creates the route information. In the present exemplary embodiment, "communication-prioritized route information" is created as the route information. The communication-prioritized route is not limited to a single route and two or more routes may be created.

At step 312, the supply section 11C supplies the position-specific communication quality information and the route information to the remote operation target vehicle M1.

At step 314, the selected route information acquisition section 11AC waits to acquire the selected route information from the remote operation target vehicle M1.

FIG. 5 illustrates an example of a route selection screen displayed on the display section 25 of the remote operation target vehicle M1. The route selection screen illustrates roads that the vehicle is able to pass along.

The route selection screen also illustrates the position-specific communication quality information. Namely, locations on the roads where the communication quality is the predetermined value or greater are shaded. Locations where the communication quality is below the predetermined value are unshaded.

The route selection screen also displays two types of route information (communication-prioritized route information)

(namely, a route 1 and a route 2). Route 1 and route 2 are created by linking together locations where the communication quality is the predetermined value or greater. In the present exemplary embodiment, the journey time (estimated time) to the destination is displayed alongside route 1 and route 2.

The occupant of the remote operation target vehicle M1 selects a desired route from the displayed route information. Specifically, the occupant specifies either button out of a "ROUTE 1" button 25A or a "ROUTE 2" button 25B on the display section 25. Note that the display section 25 functions as the input section 24. In response, determination is affirmative at step 314 in FIG. 4, and processing transitions to step 316.

At step 316, the CPU 11 determines the drive mode of the remote operation target vehicle M1 acquired at step 300, and processing transitions to step 318 in cases in which the drive mode is determined to be remotely operated driving.

At step 318, the selected route instruction section 11DA instructs the corresponding remote operation station N of the selected route acquired at step 314. The selected route is displayed on the display section 35 of the remote operation station N as illustrated in FIG. 6. Note that the CPU 11 assigns a single remote operation station N to a single remote operation target vehicle M1 based on predetermined assignation criteria. The predetermined assignation criteria may be set as appropriate, and may include the communication quality, the driving experience level of the operator of the remote operation station N, and so on.

On the other hand, processing transitions to step 320 in cases in which the drive mode is determined to be manual driving at step 316.

At step 320, the selected route instruction section 11DA instructs the remote operation target vehicle M1 of the selected route acquired at step 314. The selected route is displayed on the display section 25 of the remote operation target vehicle M1 similarly to on the display section 35 as illustrated in FIG. 6.

At step 322, the position information acquisition section 11AA acquires the position information transmitted from the information acquisition vehicles M2. Furthermore, the communication quality information acquisition section 11AB acquires the communication quality information transmitted from the information acquisition vehicles M2. Furthermore, the selected route information acquisition section 11AC acquires the current location information of the remote operation target vehicle M1 transmitted from the remote operation target vehicle M1. The position information, communication quality information, and current location information of the remote operation target vehicle M1 are acquired on a regular basis.

At step 324, the CPU 11 determines whether or not a position where the communication quality is below the predetermined value has occurred on the selected route (namely, between the current location of the remote operation target vehicle M1 and its destination). Processing transitions to step 326 in cases in which determination is affirmative at step 324. On the other hand, processing transitions to step 328 without executing the processing of step 326 in cases in which determination is negative at step 324.

At step 326, the CPU 11 performs rerouting. Namely, rerouting is performed by the CPU 11 executing processing to automatically select a diversion route avoiding the position on the selected route where the communication quality is below the predetermined value that is also a route linking together locations where the communication quality is the predetermined value or greater, and is also a route enabling mergence with the selected route in the shortest distance (the route having the shortest journey time).

At step 328, the CPU 11 determines whether or not a remote operation processing end timing has been reached. The remote operation processing is ended when determination is affirmative at step 328. For example, the end timing is reached when the remote operation target vehicle M1 arrives at its destination. As another example, the end timing is reached when the occupant of the remote operation target vehicle M1 uses the input section 24 to perform input to end the remote operation processing.

The CPU 11 repeats the processing of step 322 onward until the remote operation processing end timing is reached.

Figure 7B:
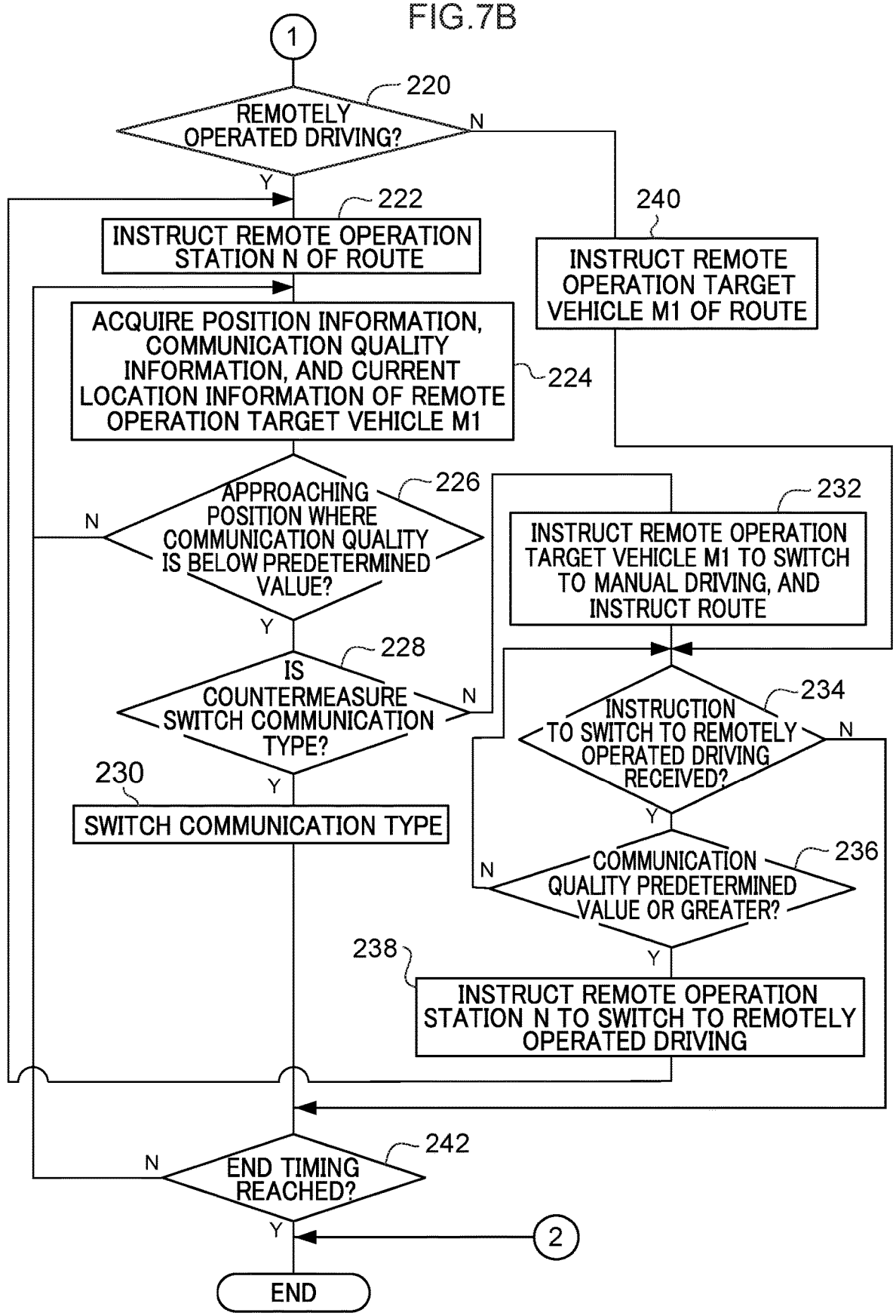
FIG. 7B is a flowchart illustrating another part of the other example of remote operation processing according to an exemplary embodiment.

Explanation follows regarding another example of operation of the remote operation system according to the present exemplary embodiment, with reference to FIG. 7A and FIG. 7B. In the example illustrated in FIG. 7A and FIG. 7B, when execution of the remote operation program 13A starts, at step 200 the drive mode information acquisition section 11AF acquires the drive mode information transmitted from the remote operation target vehicle M1. Furthermore, the selected route information acquisition section 11AC acquires the destination information transmitted from the remote operation target vehicle M1.

At step 202, the position information acquisition section 11AA acquires the position information transmitted from the information acquisition vehicles M2. Furthermore, the communication quality information acquisition section 11AB acquires the communication quality information transmitted from the information acquisition vehicles M2.

At step 204, the communication information creation section 11BA creates the position-specific communication quality information in which the position information and the communication quality information are associated with each other.

At step 206, the communication information creation section 11BA stores the position-specific communication quality information in the communication quality information database 13B.

At step 208, the route information creation section 11BB determines whether or not a predetermined volume or greater of the position-specific communication quality information has been stored. Processing transitions to step 210 when determination is affirmative at step 208. Note that "a predetermined volume or greater having been stored" refers to a state in which at least one of the position-specific communication quality information items has been stored for each of the plural blocks (see FIG. 3) present on a continuous travel route from the current location of the remote operation target vehicle M1 to its destination. Processing returns to step 202 when determination is negative at step 208, and the processing up to step 208 is repeated until determination becomes affirmative.

At step 210, the route information creation section 11BB creates the route information. In the present exemplary embodiment, "communication-prioritized route information" and "time-prioritized route information" are created as the route information. The communication-prioritized route and the time-prioritized route are not limited to a single route each, and two or more routes of each may be created.

At step 212, the supply section 11C supplies the position-specific communication quality information and the route information (communication-prioritized route information and time-prioritized route information) to the remote operation target vehicle M1.

At step 214, the selected route information acquisition section 11AC waits to acquire the selected route information from the remote operation target vehicle M1.

Figure 8:
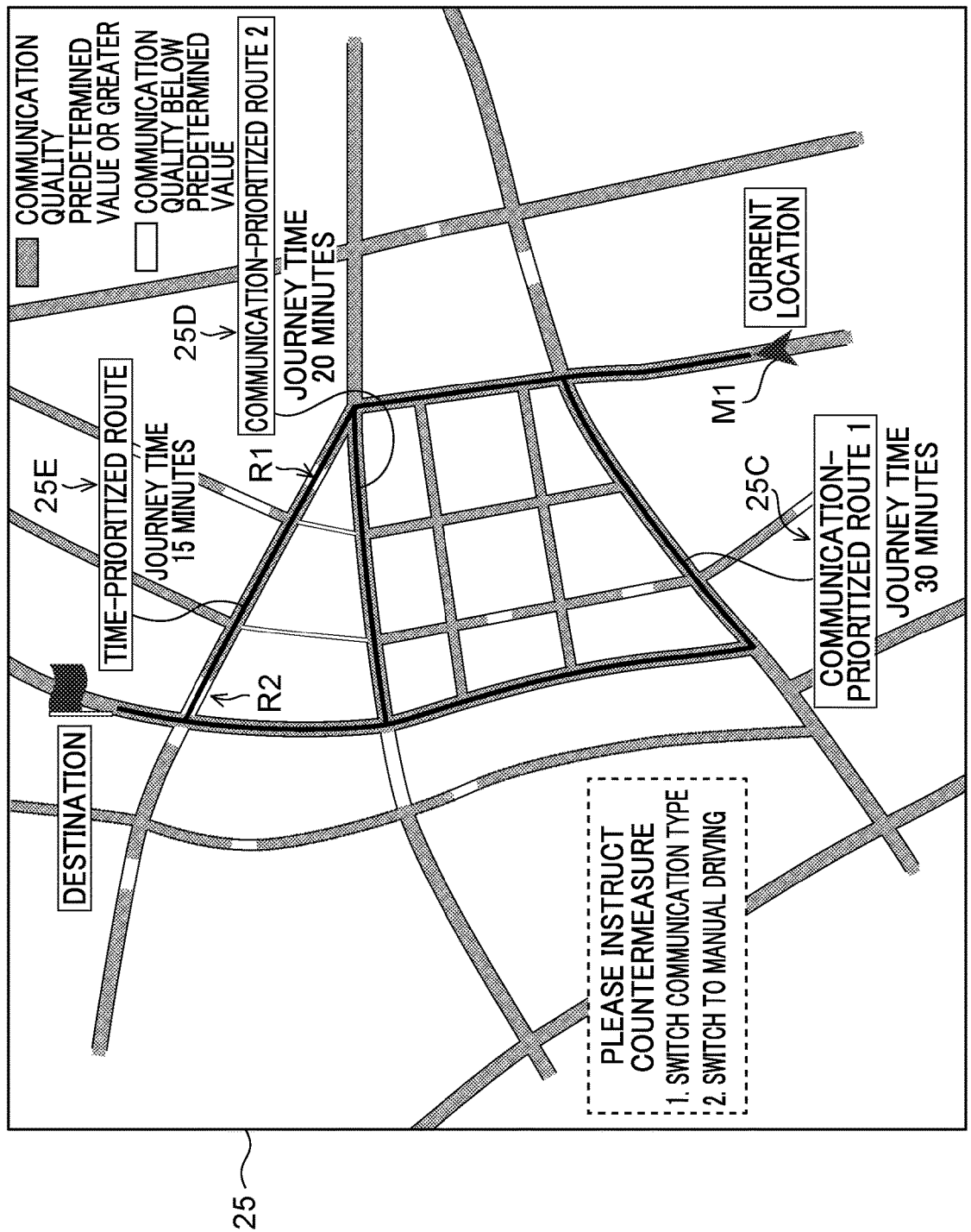
FIG. 8 is a plan view illustrating an example of position-specific communication quality information, communication-prioritized route information, and time-prioritized route information displayed on a display section of a remote operation target vehicle according to an exemplary embodiment.

FIG. 8 illustrates an example of a route selection screen displayed on the display section 25 of the remote operation target vehicle M1. The route selection screen illustrates the communication-prioritized route information (a communication-prioritized route 1 and a communication-prioritized route 2) and the time-prioritized route information (a time-prioritized route).

The communication-prioritized route 1 and the communication-prioritized route 2 are respectively similar to route 1 and route 2 in FIG. 5.

The time-prioritized route has a shorter journey time (estimated time) to the destination than the communication-prioritized route 1 and the communication-prioritized route 2. The time-prioritized route also includes locations R1, R2 where the communication quality is below the predetermined value en-route.

The occupant of the remote operation target vehicle M1 selects a desired route from the displayed route information. Specifically, the occupant specifies any one button out of a "COMMUNICATION-PRIORITIZED ROUTE 1" button 25C, a "COMMUNICATION-PRIORITIZED ROUTE 2" button 25D, or a "TIME-PRIORITIZED ROUTE" button 25E on the display section 25. In response, determination is affirmative at step 214 in FIG. 7A and processing transitions to step 216.

At step 216, the CPU 11 determines whether or not the selected route acquired at step 214 is the time-prioritized route. Processing transitions to step 218 in cases in which determination is affirmative at step 216.

At step 218, the CPU 11 waits to acquire countermeasure information. The countermeasure information is selected by the occupant of the remote operation target vehicle M1 from out of options displayed on the display section 25 when the occupant of the remote operation target vehicle M1 has specified the "TIME-PRIORITIZED ROUTE" button 25E.

Specifically, when the occupant of the remote operation target vehicle M1 specifies the "TIME-PRIORITIZED ROUTE" button 25E, for example the message surrounded by a dashed line in FIG. 8 is displayed on the display section 25. In this example, the text "PLEASE INSTRUCT COUNTERMEASURE" is displayed together with the two countermeasures: "1. SWITCH COMMUNICATION TYPE" and "2. SWITCH TO MANUAL DRIVING". Determination is affirmative at step 218 in FIG. 7A and processing transitions to step 220 in FIG. 7B in response to the occupant of the remote operation target vehicle M1 specifying one of these options.

At step 220, the CPU 11 determines the drive mode of the remote operation target vehicle M1 acquired at step 200. Processing transitions to step 222 in cases in which the drive mode is determined to be remotely operated driving.

At step 222, the selected route instruction section 11DA instructs the remote operation station N of the selected route acquired at step 214. The selected route is displayed on the display section 35 of the remote operation station N as illustrated in FIG. 9. Note that the CPU 11 assigns a single remote operation station N to a single remote operation target vehicle M1 based on predetermined assignation criteria. The predetermined assignation criteria may be set as appropriate, and may include the communication quality, the driving experience level of the operator of the remote operation station N, and so on.

At step 224, the position information acquisition section 11AA acquires the position information transmitted from the information acquisition vehicles M2. Furthermore, the communication quality information acquisition section 11AB acquires the communication quality information transmitted from the information acquisition vehicles M2. Furthermore, the selected route information acquisition section 11AC acquires the current location information of the remote operation target vehicle M1 transmitted from the remote operation target vehicle M1. The position information, communication quality information, and current location information of the remote operation target vehicle M1 are acquired on a regular basis.

At step 226, the CPU 11 determines whether or not the remote operation target vehicle M1 is approaching a position where the communication quality is below the predetermined value (whether or not the remote operation target vehicle M1 is positioned in an adjacent journey segment as described above). Processing transitions to step 228 in cases in which determination is affirmative at step 226. On the other hand, processing returns to step 224 in cases in which determination is negative at step 226.

At step 228, the execution section 11DB determines the countermeasure acquired at step 218. Processing transitions to step 230 in cases in which the countermeasure is determined to be "switch communication type", and at step 230 the execution section 11DB switches the communication type. Processing transitions to step 242 following step 230.

On the other hand, processing transitions to step 232 in cases in which the countermeasure is determined to be "switch to manual driving" at step 228.

At step 232, the execution section 11DB transmits an instruction to the remote operation target vehicle M1 to switch to manual driving. Furthermore, the selected route instruction section 11DA instructs the remote operation target vehicle M1 of the selected route acquired at step 214. The selected route is displayed on the display section 25 of the remote operation target vehicle M1 similarly to the selected route on the display section 35 illustrated in FIG. 9. The occupant of the remote operation target vehicle M1 then operates the drive devices 29C in response to the switch instruction.

At step 234, the CPU 11 determines whether or not the drive mode information acquisition section 11AF has received an instruction to switch to remotely operated driving. Processing transitions to step 236 in cases in which determination is affirmative at step 234.

At step 236, the CPU 11 determines whether or not the remote operation target vehicle M1 is at a position where the communication quality is the predetermined value or greater. Processing transitions to step 238 in cases in which determination is affirmative at step 236. On the other hand, processing returns to step 234 in cases in which determination is negative at step 236.

At step 238, the CPU 11 instructs the remote operation station N to switch to remotely operated driving. The processing of step 222 onward is repeated following step 238.

On the other hand, processing transitions to step 240 in cases in which the drive mode is determined to be manual driving at step 220.

At step 240, the selected route instruction section 11DA instructs the remote operation target vehicle M1 of the selected route acquired at step 214. The selected route is displayed on the display section 25 of the remote operation target vehicle M1 similarly to the selected route on the display section 35 illustrated in FIG. 9. Processing transitions to step 234 following step 240.

At step 242, the CPU 11 determines whether or not a remote operation processing end timing has been reached. The remote operation processing is ended when determination is affirmative at step 242. For example, the end timing is reached when the remote operation target vehicle M1 arrives at its destination. As another example, the end timing is reached when the occupant of the remote operation target vehicle M1 uses the input section 24 to perform input to end the remote operation processing.

The CPU 11 repeats the processing from step 224 until the remote operation processing end timing is reached.

Processing transitions to step 244 in cases in which determination is negative at step 216 in FIG. 7A, i.e. in cases in which the selected route acquired at step 214 is determined to be a communication-prioritized route.

At step 244, the CPU 11 determines the drive mode of the remote operation target vehicle M1 acquired at step 200. Processing transitions to step 246 in cases in which the drive mode is determined to be remotely operated driving.

At step 246, the selected route instruction section 11DA instructs the remote operation station N of the selected route acquired at step 214. The selected route is displayed on the display section 35 of the remote operation station N as illustrated in FIG. 6.

On the other hand, processing transitions to step 248 in cases in which the drive mode is determined to be manual driving at step 244.

At step 248, the selected route instruction section 11DA instructs the remote operation target vehicle M1 of the selected route acquired at step 214. The selected route is displayed on the display section 25 of the remote operation target vehicle M1 similarly to the selected route on the display section 35 illustrated in FIG. 6.

At step 250, the position information acquisition section 11AA acquires the position information transmitted from the information acquisition vehicles M2. Furthermore, the communication quality information acquisition section 11AB acquires the communication quality information transmitted from the information acquisition vehicles M2. Furthermore, the selected route information acquisition section 11AC acquires the current location information of the remote operation target vehicle M1 transmitted from the remote operation target vehicle M1. The position information, communication quality information, and current location information of the remote operation target vehicle M1 are acquired on a regular basis.

At step 252, the CPU 11 determines whether or not a position where the communication quality is below the predetermined value is present on the selected route (namely, between the current location of the remote operation target vehicle M1 and its destination). Processing transitions to step 254 in cases in which determination is affirmative at step 252. On the other hand, processing transitions to step 256 without executing the processing of step 254 in cases in which determination is negative at step 252.

At step 254, the CPU 11 performs rerouting. Namely, rerouting is performed by the CPU 11 executing processing to automatically select a diversion route avoiding the position on the selected route where the communication quality is below the predetermined value that is also a route linking together locations where the communication quality is the predetermined value or greater, and is also the route capable of merging with the selected route in the shortest distance (the route having the shortest journey time).

At step 256, the CPU 11 determines whether or not a remote operation processing end timing has been reached. The remote operation processing is ended as illustrated in FIG. 7B when determination is affirmative at step 256. For example, the end timing is reached when the remote operation target vehicle M1 arrives at its destination. As another example, the end timing is reached when the occupant of the remote operation target vehicle M1 uses the input section 24 to perform input to end the remote operation processing.

The processing of step 250 onward is repeated until the remote operation processing end timing is reached.

Explanation has been given regarding two examples of processing by the remote operation system 80 according to the present exemplary embodiment. As illustrated by these examples, the route information creation section 11BB is capable of creating a communication-prioritized route alone (the example illustrated by the flowchart of FIG. 4) and is also capable of creating both a communication-prioritized route and a time-prioritized route (the example illustrated by the flowchart of FIG. 7).

In this manner, the remote operation system 80 according to the present exemplary embodiment supplies the operator of the remote operation target vehicle M1 (the operator of the drive devices 29C of the remote operation target vehicle M1 or the operator of the remote operation devices 39A of the remote operation station N) with the position-specific communication quality information in which the position information and communication quality information of each of the plural vehicles (information acquisition vehicles M2) are associated with each other. The position-specific communication quality information is created based on the position information and the communication quality information that are acquired "on a regular basis". The information is thus newer and more reliable than when position-specific communication quality information is held by a system in advance.

The operator of the remote operation target vehicle M1 is thus capable of more accurately perceiving positions where communication quality is high and positions where communication quality is low. This enables the operator to remotely operate the remote operation target vehicle M1 so as to avoid positions where communication quality is low. The remote operation target vehicle M1 can thus be made to travel so as to avoid positions where communication quality is low.

In the remote operation system 80 according to the present exemplary embodiment, the supply section 11C supplies the operator with the route information linking together positions where the communication quality is the predetermined value or greater, as well as the position-specific communication quality information. Thus, the operator more easily selects a route with high communication quality than in cases in which the operator is not supplied with route information. This increases the ease with which the remote operation target vehicle M1 is made to travel so as to avoid positions where communication quality is low.

In the remote operation system 80 according to the present exemplary embodiment, in cases in which the drive mode of the remote operation target vehicle M1 is set to manual driving, the position-specific communication quality information can be supplied to the occupant of the remote operation target vehicle M1. This increases the ease with which the remote operation target vehicle M1 can be made to travel so as to avoid positions where communication quality is low during manual driving also. This facilitates switching to remotely operated driving at a desired timing.

In the remote operation target vehicle M1 according to the present exemplary embodiment, the drive devices 29C are operated based on the remote operation information received by a communication device (the communication I/F 28). A route linking together positions where the communication quality is the predetermined value or greater is created as a travel route in the remote operation information, based on the position information and the communication quality information acquired from the plural information acquisition vehicles M2. This enables the remote operation target vehicle M1 to be made to travel so as to avoid positions where communication quality is low.

The remote operation information is created based on the position information and the communication quality information acquired from the plural information acquisition vehicles M2 "on a regular basis". The information is thus newer and more reliable than when position-specific communication quality information is held by a system in advance. This increases the ease with which the remote operation target vehicle M1 can be made to travel so as to avoid positions where communication quality is low.

In the remote operation system 80 according to the present exemplary embodiment, the occupant of the remote operation target vehicle M1 is supplied with communication-prioritized route information representing a route linking together positions where the communication quality is the predetermined value or greater. Time-prioritized route information representing a route having a shorter journey time to the destination is also supplied. The occupant selects a route based on any one route information item. The remote operation station is instructed of the selected route information thus selected through the selected route instruction section 11DA.

In cases in which the time-prioritized route is selected by the occupant and the remote operation target vehicle travels through a position where the communication quality is below the predetermined value, the execution section 11DB acts as an execution section to execute the predetermined countermeasure so as to enable stable travel to be maintained.

Accordingly, stable travel can be maintained at positions where communication quality is low while giving greater priority to the journey time to the destination than in cases in which a route linking together positions where the communication quality is the predetermined value or greater has been selected.

The remote operation system 80 according to the present exemplary embodiment enables the execution section 11DB to switch the communication type in cases in which the remote operation target vehicle travels through a position where the communication quality is below the predetermined value. Namely, stable travel can be maintained by switching to a communication type capable of securing communication quality.

Moreover, the execution section 11DB is capable of switching to manual driving in cases in which the remote operation target vehicle M1 travels through a position where the communication quality is below the predetermined value. This enables stable travel to be maintained even if communication cuts out.

In the remote operation target vehicle M1 according to the present exemplary embodiment, the drive devices 29C are operated based on the remote operation information received by the communication device (communication I/F 28). Moreover, a predetermined countermeasure, capable of maintaining stable travel in cases in which the remote operation target vehicle M1 travels through a position where the communication quality is below the predetermined value, can be selected using the input device (input section 24).

Accordingly, stable travel can be maintained at positions where communication quality is low while giving greater priority to the journey time to the destination than in cases in which a route linking together positions where the communication quality is the predetermined value or greater has been selected.

Note that in the exemplary embodiment described above, the route information is displayed on the display section 25 of the remote operation target vehicle M1 or on the remote operation station N. However, the present disclosure is not limited to such an exemplary embodiment. For example, route information may be conveyed to the occupant of the remote operation target vehicle M1 or to the operator of the remote operation station N using audio only, without being displayed. Moreover, there is no need to input the selected route information using the input section 24, and for example audio input may be performed.

In the exemplary embodiment described above, the route information creation section 11BB creates route information linking together positions where the communication quality is the predetermined value or greater as the "communication-prioritized route". However, the present disclosure is not limited to such an exemplary embodiment. The route information creation section 11BB may create route information for a route having stable communication quality as a "communication stability-prioritized route" in addition to or instead of the communication-prioritized route.

Such a communication stability-prioritized route is a route linking together positions where the communication quality is "continuously" maintained at a predetermined value or greater. "Continuously" refers to a predetermined timespan or longer (for example one hour or longer).

Moreover, the route information creation section 11BB may create either a communication-prioritized route or a communication stability-prioritized route, and not create a time-prioritized route. In cases in which a time-prioritized route is not created, input of a countermeasure using the input section 24, acquisition of the countermeasure by the countermeasure information acquisition section 11AD, and execution of the countermeasure by the execution section 11DB need not be performed.

Note that in cases in which a time-prioritized route is not created, the execution section 11DB may still execute a countermeasure. Namely, the execution section 11DB may execute a countermeasure in cases in which the communication quality suddenly falls below the predetermined value during travel of the remote operation target vehicle M1 along the communication-prioritized route, the communication stability-prioritized route, or a desired route selected by the operator of the remote operation target vehicle M1. Namely, the execution section 11DB may thus have a failsafe function in cases in which the remote operation target vehicle M1 travels through a position where the communication quality is below the predetermined value for any reason.

The route information creation section 11BB may be omitted from the creation section 11B. In such cases, the supply section 11C need not supply the route information. Even if route information is not created and supplied, the operator of the remote operation target vehicle M1 is still capable of making the remote operation target vehicle M1 travel so as to avoid positions where communication quality is low by checking the position-specific communication quality information.

In the exemplary embodiment described above, the occupant of the remote operation target vehicle M1 is supplied with both the position-specific communication quality information and the route information during manual driving. However, the present disclosure is not limited to such an exemplary embodiment. For example, configuration may be made in which none of this information is supplied during manual driving. This enables stable travel to be secured even in cases in which the communication quality becomes low during manual driving.

In the exemplary embodiment described above, at least one out of switching the communication type and switching to manual driving is selected as the countermeasure. However, the present disclosure is not limited to such an exemplary embodiment. For example, either one out of switching the communication type or switching to manual driving may be set as the countermeasure.

In the exemplary embodiment described above, the hardware structure of a processing unit that executes the respective processing of the acquisition section 11A, the creation section 11B, the supply section 11C, and the instruction section 11D may for example employ the following processors. Such processors include not only CPUs, these being generic processors that execute software (programs) as described above to function as a processing section, but also programmable logic devices (PLDs), these being processors such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing.

The respective processing sections may be configured by one type of these processors, or may be configured by a combination of two or more processors of the same type or different types to each other (for example a combination of plural FPGAs, or a combination of a CPU and an FPGA). A processing section may also be configured by a single processor.

A first example of a processing section configured by a single processor is a case in which a single processor configured by combining software with one or more CPUs functions as a processing section, as exemplified by a client or server computer. A second example is a case in which a processor is employed to implement the functionality of an entire system, encompassing processing sections, by the use of a single integrated circuit (IC) chip, as exemplified by a system on chip (SoC) or the like. In this manner, the processing sections are configured by a hardware structure employing one or more of the processors described above.

A more specific example of a hardware structure of these various processors may employ electric circuitry combining circuit elements such as semiconductor elements. As this demonstrates, the present disclosure may be implemented in various ways.

What is claimed is:

1. A remote operation system comprising:
a processor configured to:
    acquire position information and communication quality information from each of a plurality of vehicles, on a regular basis;
    create position-specific communication quality information in which the position information and the communication quality information are associated with each other;
    create communication-prioritized route information representing a route linking together positions where communication quality is a predetermined value or greater, based on the position-specific communication quality information;
    create time-prioritized route information representing a route having a shorter journey time to a destination of a remote operation target vehicle than a communication-prioritized route,
    the communication-prioritized route information being created when at least one item of the position-specific communication quality information has been stored for each of a plurality of blocks present on a continuous travel route from a current location of the remote operation target vehicle to the destination of the remote operation target vehicle;
    supply the communication-prioritized route information and the time-prioritized route information to an occupant of the remote operation target vehicle; and
    when the occupant selects the time-prioritized route information, display a predetermined countermeasure enabling travel stability to be maintained at a position where communication quality is below a predetermined value, and execute the predetermined countermeasure that is selected by the occupant, wherein
    at least one of switching a communication type or switching to manual driving is selected as the predetermined countermeasure, and
    the predetermined countermeasure selected by the occupant is executed in journey segments of the continuous travel route before and after the position where the communication quality is below the predetermined value.

2. The remote operation system of claim 1, wherein:
the processor is configured to:
    acquire drive mode information representing whether the remote operation target vehicle is set to remotely operated driving or manual driving; and
    supply the position-specific communication quality information to an occupant of the remote operation target vehicle, in cases in which a drive mode is manual driving.

3. The remote operation system of claim 1, wherein:
the processor is configured to:
    acquire drive mode information representing whether the remote operation target vehicle is set to remotely operated driving or manual driving; and
    supply the position-specific communication quality information to an occupant of the remote operation target vehicle, in cases in which a drive mode is manual driving.

4. A non-transitory computer readable storage medium storing a program that causes a computer to:
acquire position information and communication quality information from each of a plurality of vehicles;
create position-specific communication quality information in which the position information and the communication quality information are associated with each other;
create communication-prioritized route information representing a route linking together positions where communication quality is a predetermined value or greater, based on the position-specific communication quality information;
create time-prioritized route information representing a route having a shorter journey time to a destination of a remote operation target vehicle than a communication-prioritized route,
the communication-prioritized route information being created when at least one item of the position-specific communication quality information has been stored for each of a plurality of blocks present on a continuous travel route from a current location of the remote operation target vehicle to a destination of the remote operation target vehicle;

supply the communication-prioritized route information and the time-prioritized route information to an occupant of the remote operation target vehicle; and when the occupant selects the time-prioritized route information, display a predetermined countermeasure enabling travel stability to be maintained at a position where communication quality is below a predetermined value, and execute the predetermined countermeasure that is selected by the occupant, wherein at least one of switching a communication type or switching to manual driving is selected as the predetermined countermeasure, and the predetermined countermeasure selected by the occupant is executed in journey segments of the continuous travel route before and after the position where the communication quality is below the predetermined value.

5. A vehicle comprising:

a communication device configured to receive remote operation information created by a remote operation station; and a drive device comprising a steering actuator, an acceleration actuator, and a brake actuator, the drive device being operated based on the remote operation information, wherein a route linking together positions where communication quality of the remote operation information is a predetermined value or greater is created as a communication-prioritized travel route, based on position information and communication quality information acquired on a regular basis from a plurality of information acquisition vehicles, a time-prioritized travel route representing a route having a shorter journey time to a destination of a remote operation target vehicle than the communication-prioritized travel route is created, position-specific communication quality information is created in which the position information and the communication quality information are associated with each other, the communication-prioritized travel route is created when at least one item of the position-specific communication quality information has been stored for each of a plurality of blocks present on a continuous travel route from a current location of a remote operation target vehicle to the destination of the remote operation target vehicle, the communication-prioritized travel route and the time-prioritized travel route are supplied to an occupant of the remote operation target vehicle, when the occupant selects the time-prioritized travel route, a predetermined countermeasure enabling travel stability to be maintained at a position where communication quality is below a predetermined value is displayed, and the predetermined countermeasure that is selected by the occupant is executed, at least one of switching a communication type or switching to manual driving is selected as the predetermined countermeasure, and the predetermined countermeasure selected by the occupant is executed in journey segments of the continuous travel route before and after the position where the communication quality is below the predetermined value.

6. The remote operation system of claim 1, wherein:

the route linking together the positions where the communication quality is the predetermined value or greater is a first route, and the processor is configured to:
in cases in which the communication-prioritized route is selected, create a diversion route that avoids a position where the communication quality is less than the predetermined value, the diversion route being a second route that is different from the first route.

7. The remote operation system of claim 6 wherein:

the second route is a route capable of merging with the first route in the shortest distance.

* * * * *